United States Patent
Kupratis et al.

(10) Patent No.: US 11,286,856 B2
(45) Date of Patent: *Mar. 29, 2022

(54) DIVERSION OF FAN AIR TO PROVIDE COOLING AIR FOR GAS TURBINE ENGINE

(71) Applicant: Raytheon Technologies Corporation, Farmington, CT (US)

(72) Inventors: Daniel Bernard Kupratis, Wallingford, CT (US); Anthony R. Bifulco, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 226 days.

This patent is subject to a terminal disclaimer.

(21) Appl. No.: 16/357,392

(22) Filed: Mar. 19, 2019

(65) Prior Publication Data

US 2020/0025080 A1    Jan. 23, 2020

Related U.S. Application Data

(63) Continuation of application No. 14/635,366, filed on Mar. 2, 2015, now Pat. No. 10,253,694.

(51) Int. Cl.
  *F02C 7/14* (2006.01)
  *F02C 7/143* (2006.01)
  *F01D 9/04* (2006.01)
  *F02C 7/12* (2006.01)
  *F02C 7/18* (2006.01)
  (Continued)

(52) U.S. Cl.
  CPC .............. *F02C 7/143* (2013.01); *F01D 9/041* (2013.01); *F02C 3/13* (2013.01); *F02C 3/32* (2013.01); *F02C 7/10* (2013.01); *F02C 7/12* (2013.01); *F02C 7/18* (2013.01); *F02C 9/18* (2013.01); *F05D 2220/32* (2013.01); *F05D 2260/14* (2013.01); *F05D 2260/205* (2013.01);
  (Continued)

(58) Field of Classification Search
  CPC .... F02C 7/143; F02C 7/10; F02C 7/12; F02C 7/18; F02C 3/13; F02C 3/32; F02C 9/18
  See application file for complete search history.

(56) References Cited

U.S. PATENT DOCUMENTS

RE32,756 E   9/1988  Mowill
5,297,386 A   3/1994  Kervistin
(Continued)

FOREIGN PATENT DOCUMENTS

EP       0584958 A1    3/1994

OTHER PUBLICATIONS

European Search Report for European Application No. 16158104.6 dated Jul. 27, 2016.

*Primary Examiner* — Michael L Sehn
(74) *Attorney, Agent, or Firm* — Carlson, Gaskey & Olds, P.C.

(57) ABSTRACT

A gas turbine engine section includes a plurality of spaced rotor stages, with a static guide vane intermediate the spaced rotor stages. The static guide vane provides swirl into air passing toward a downstream one of the spaced rotor stages, and an outer housing surrounding the spaced rotor stages. A diverter diverts a portion of air radially outwardly through the outer housing, and across at least one heat exchanger. The diverted air passes back into a duct radially inwardly through the outer housing, and is exhausted toward the downstream one of the spaced rotor stages.

20 Claims, 5 Drawing Sheets

(51) Int. Cl.
  *F02C 9/18*   (2006.01)
  *F02C 3/13*   (2006.01)
  *F02C 3/32*   (2006.01)
  *F02C 7/10*   (2006.01)

(52) U.S. Cl.
  CPC .. *F05D 2260/232* (2013.01); *F05D 2260/601* (2013.01); *Y02T 50/60* (2013.01)

(56) References Cited

U.S. PATENT DOCUMENTS

| | | | |
|---|---|---|---|
| 5,394,688 A | | 3/1995 | Amos |
| 5,581,996 A | | 12/1996 | Koch et al. |
| 5,697,208 A | * | 12/1997 | Glezer ................... F01D 5/022 60/785 |
| 6,134,880 A | | 10/2000 | Yoshinaka |
| 6,662,546 B1 | | 12/2003 | Giffin, III |
| 6,968,692 B2 | * | 11/2005 | Chin ........................ F23R 3/14 431/182 |
| 8,495,883 B2 | | 7/2013 | Foust et al. |
| 8,683,811 B2 | * | 4/2014 | Clemen ................ F04D 29/681 60/782 |
| 2010/0326079 A1 | | 12/2010 | Zuo et al. |

\* cited by examiner

DIVERSION OF FAN AIR TO PROVIDE COOLING AIR FOR GAS TURBINE ENGINE

CROSS-REFERENCE TO RELATED APPLICATION

This application is a continuation of U.S. application Ser. No. 14/635,366 filed on Mar. 2, 2015.

BACKGROUND OF THE INVENTION

This application relates to an arrangement which provides cooling air downstream of a fan or compressor rotor.

Gas turbine engines are known and typically include a fan delivering air into a compressor where it is compressed and then delivered into a combustor. The air is mixed with fuel and ignited in the combustor and products of this combustion pass downstream over turbine rotors driving them to rotate.

To provide fuel efficiency, much effort is made in the overall improvement of the efficient use of all aspects of a gas turbine engine. A good deal of the air delivered by the fan is utilized to cool various components, as one example.

SUMMARY OF THE INVENTION

In a featured embodiment, a gas turbine engine section comprises a plurality of spaced rotor stages, with a static guide vane intermediate the spaced rotor stages. The static guide vane provides swirl into air passing toward a downstream one of the spaced rotor stages, and an outer housing surrounding the spaced rotor stages. A diverter diverts a portion of air radially outwardly through the outer housing, and across a heat exchanger. The diverted air passes back into a duct radially inwardly through the outer housing, and is exhausted toward the downstream one of the spaced rotor stages.

In another embodiment according to the previous embodiment, the exhausted air passes through an injector. The injector imparts swirl into the air exhausting toward the downstream one of the two spaced turbine rotors.

In another embodiment according to any of the previous embodiments, a swirl angle imparted by the injector is greater than a swirl angle imparted by the static guide vane.

In another embodiment according to any of the previous embodiments, a swirl angle imparted by the static guide vane is greater than 40 degrees.

In another embodiment according to any of the previous embodiments, the swirl angle is greater than 55 degrees.

In another embodiment according to any of the previous embodiments, at least one heat exchanger cools an electronic component.

In another embodiment according to any of the previous embodiments, at least one heat exchanger cools air from a compressor rotor.

In another embodiment according to any of the previous embodiments, the spaced rotor stages are fan or compressor rotors. A swirl angle is imparted by the static guide vane is greater than 40 degrees.

In another embodiment according to any of the previous embodiments, a swirl angle imparted by the static guide vane is greater than 40 degrees.

In another embodiment according to any of the previous embodiments, a bypass housing surrounds the outer housing. At least one heat exchanger is positioned within a flow path in the bypass housing.

In another embodiment according to any of the previous embodiments, air in said flow path cools said at least one heat exchanger.

In another embodiment according to any of the previous embodiments, there are a plurality of heat exchangers.

In another embodiment according to any of the previous embodiments, a swirl angle imparted by the static guide vane is greater than 40 degrees.

In another embodiment according to any of the previous embodiments, the swirl angle is greater than 55 degrees.

In another embodiment according to any of the previous embodiments, said portion of air diverted radially outwardly passes through a duct, which extends generally axially in one direction, then turns back in an opposed direction before passing radially inwardly and being exhausted.

In another embodiment according to any of the previous embodiments, the portion of air diverted radially outwardly passes into a duct which extends circumferentially around a center axis of the engine before being directed radially inwardly and being exhausted.

In another featured embodiment, a gas turbine engine section includes a plurality of spaced rotor stages. A swirl means is intermediate the spaced rotor stages, providing swirl into air passing toward a downstream one of the spaced rotor stages. An outer housing surrounds the spaced rotor stages. A diverter means diverts a portion of air radially outwardly through the outer housing, and across at least one heat exchanger. The diverter means passes the diverted air back into a duct radially inwardly through the outer housing. The diverter means exhausts the air toward the downstream one of the spaced rotor stages.

In another embodiment according to the previous embodiment, a swirl angle imparted by the swirl means is greater than 40 degrees.

In another embodiment according to any of the previous embodiments, the swirl angle is greater than 55 degrees.

In another embodiment according to any of the previous embodiments, the swirl means includes a static guide vane.

These and other features may be best understood from the following drawings and specification.

DETAILED DESCRIPTION

Figure 1A:
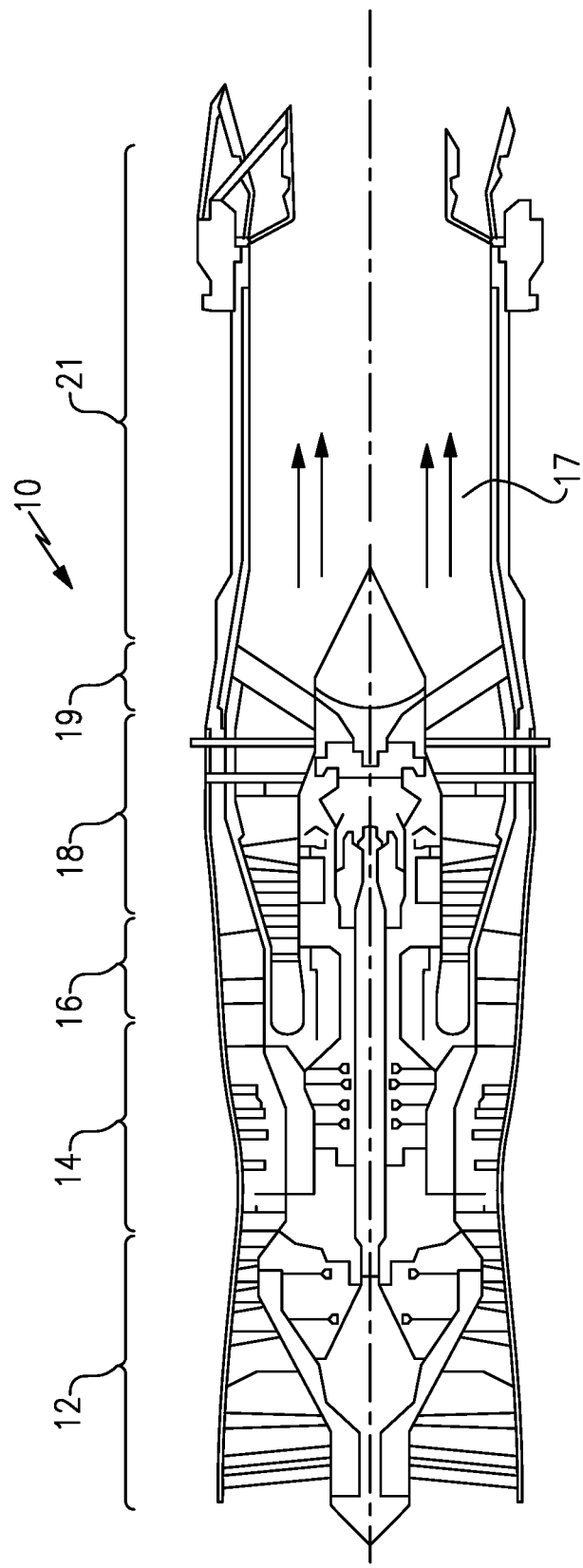
FIG. 1A shows an embodiment of a gas turbine engine.

Referring to FIG. 1A, one basic type of gas turbine engine 10, which includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16.

In the combustor section 16, the compressed air is mixed with gas and ignited to generate a hot exhaust stream 17. The hot exhaust stream 17 is expanded through the turbine section 18 to drive the fan section 12 and the compressor section 14. In this example, the gas turbine engine 10 includes an augmenter section 19 where additional fuel can be mixed with the exhaust gasses 17 and ignited to generate additional thrust. The exhaust gasses 17 flow from the turbine section 18 and the augmenter section 19 through an exhaust liner assembly 21.

Figure 1B:
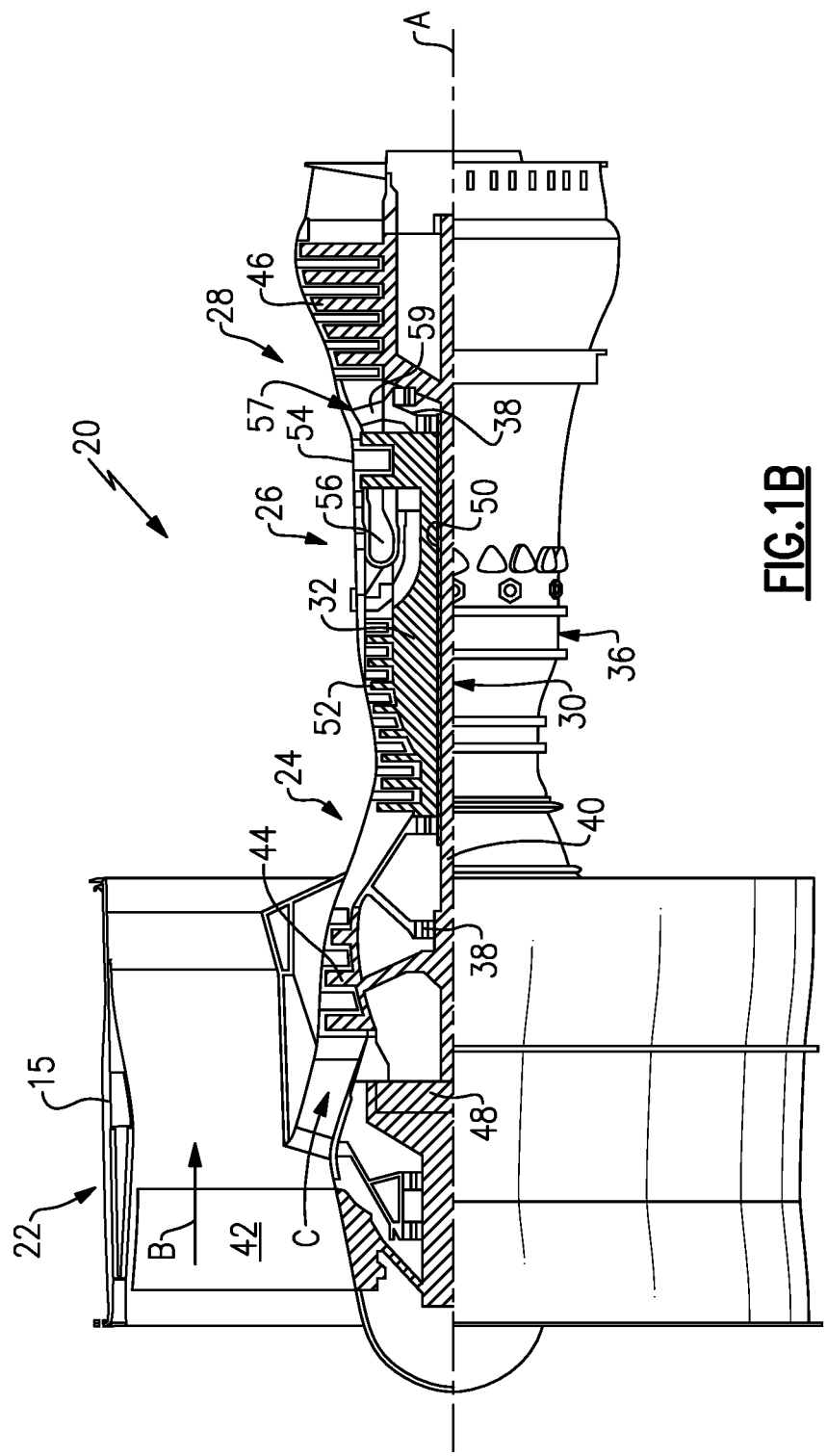
FIG. 1B shows another embodiment of a gas turbine engine.

FIG. 1B schematically illustrates a second type gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
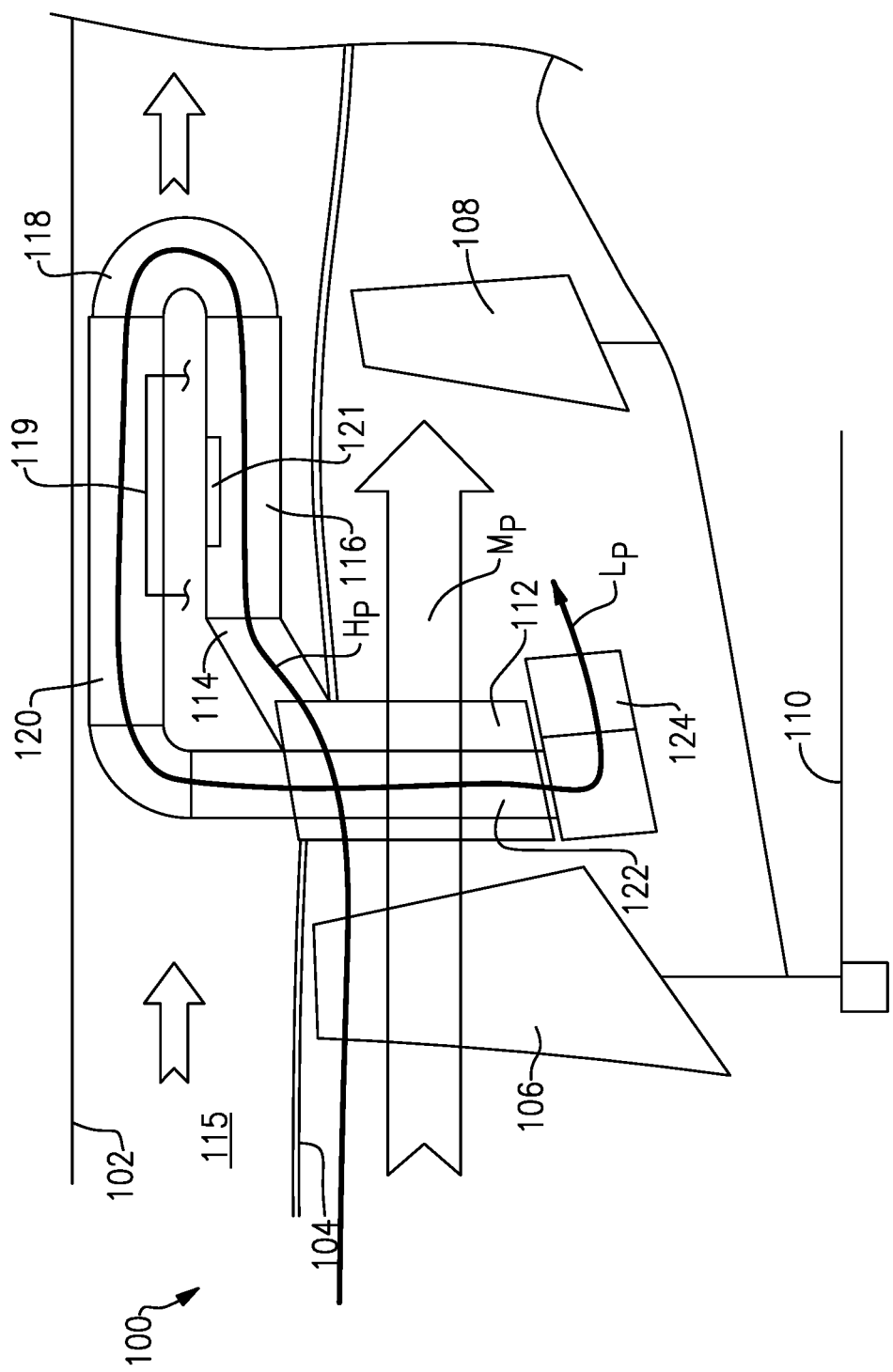
FIG. 2A shows an embodiment of a fan cooling arrangement.

FIG. 2A shows a fan section arrangement 100 which is illustrated and incorporated into the type of gas turbine engine generally shown in FIG. 1A. However, the general teachings of this disclosure would extend to fan or compressor sections as utilized in either of the FIG. 1A or FIG. 1B gas turbine engines.

The fan section 100 is positioned inwardly of an outer bypass housing 102 and within a core housing 104. As shown, an upstream fan rotor 106 delivers air toward a downstream fan rotor 108. A shaft 110 drives the rotors 106 and 108. An exit stator vane 112 is positioned intermediate the rotors 106 and 108. A worker of ordinary skill in the art would recognize that there would be a plurality of such stator vanes 112 spaced circumferentially about an axis of rotation of shaft 110. Stator vanes 112 are "high swirl" vanes. A high swirl vane could be defined as a vane which imparts a swirl or a direction of movement to the air which is not parallel to the axis of the shaft 110. Such vanes are typically utilized in turbine sections of gas turbine engines, but not fan or compressor sections.

The term "high swirl" could be defined as imparting a direction of movement of the air that is equal to or greater than 40 degrees offset from being parallel to the center axis of the shaft 110. More narrowly, the angle may be equal to or greater than 45 degrees and even more narrowly equal to or greater than 55 degrees. In one embodiment, the guide vane 112 imparted a swirl angle of 60 degrees.

Imparting the swirl into the air creates a pressure gradient in a radial direction. In particular, higher pressures Hp are found radially outwardly and lower pressures Lp are found radially inwardly due to the centrifugal forces imparted by the swirl. Notably, the main air flow from the fan is at an intermediate or moderate pressure $M_p$.

A vent or diverter 114 vents a portion of the higher pressure Hp air across a heat exchanger 116. As is clear from FIG. 2A only a portion of the higher pressure air Hp is diverted. The main air flow is shown by arrow Mp continuing on to the rotor stage 108 without being diverted. In the disclosed embodiment, an elbow 118 communicates the air downstream of the heat exchanger 116 into another heat exchanger 120. The heat exchangers 116 and 120 utilize the fan air diverted into the diverter 114 to cool components, such as an electronics component 121, shown schematically, or a compressor air line 119, also shown schematically. As understood, air 115 in a bypass duct between housings 102 and 104 will also provide cooling.

Downstream of the heat exchanger 120, the air passes into a return duct 122, and may exit toward the fan rotor 108 through a tangential onboard injector 124. The tangential onboard injector is a known component which also imparts swirl to the air. In one embodiment, the swirl angle of the injector 124 will be greater than the swirl angle provided by the guide vane 112.

The disclosed embodiment, thus, utilizes the provision of swirl to drive the air downstream of the fan rotor 106 through the operation of the pressure gradient and achieves cooling at heat exchangers 116 and 120 to improve the overall efficiency of a related gas turbine engine.

The high swirl vane 112 and the injector 124 ensure pressure stability of the system, due to the swirl induced to the flows from each element. To visualize the effect, if a bucket full of water is grasped by a handle and a person holding the bucket whirls himself, with the bucket held horizontally, the water will stay in the bucket. A designer can enhance the pressure differential in the system by designing the upstream rotor 106 so it does more work at the tip than at the hub, which will create a larger pressure rise in the flow at the tip than at the hub. The rotor 106 thus creates a total pressure gradient from hub to tip, and the vane 112 creates a static pressure gradient from hub to tip. Thus, the rotor 106 enhances pressure gradient to the stator 112

Figure 2B:
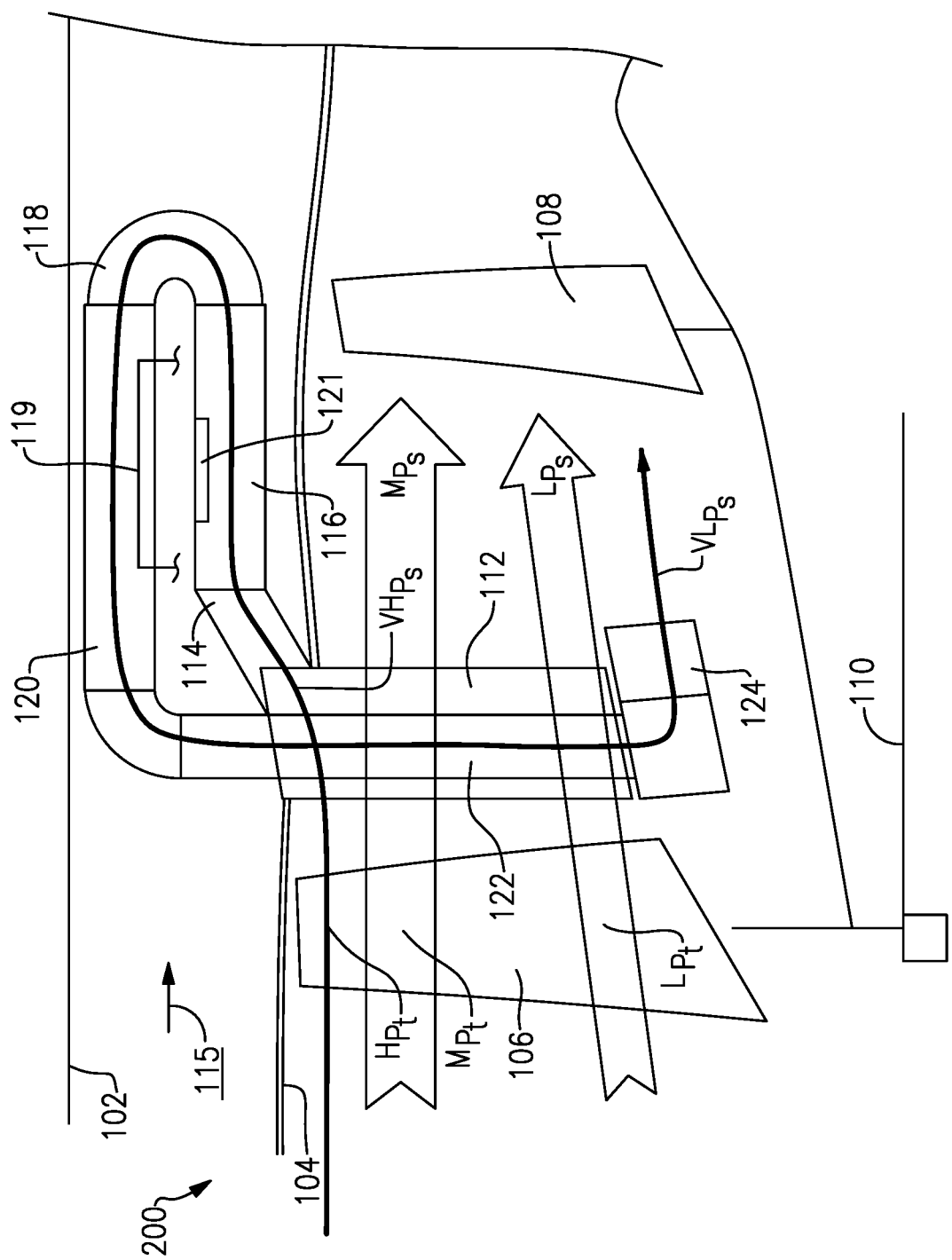
FIG. 2B shows an embodiment of a fan cooling arrangement.

FIG. 2B shows an embodiment 200. Here, upstream rotor 106 creates a smaller total pressure rise $Lp_t$, an area of moderate pressure rise $Mp_t$, and a larger pressure rise $Hp_t$. The high swirl vane 112 receives these total pressures and creates a very high static pressure $VHp_s$ at the inlet to the vent 114. The pressure $VHp_s$ drives the flow through the ducts and out of the injector 124. The air leaving the vent is at a pressure $VLp_s$ at the exit of the injector 124, and this pressure moves towards the hub of the downstream rotor 108. Thus, the static pressure gradient seen by rotor 108 from the hub to tip is $VLp_s$, $Lp_s$, and $Mp_s$. The pressure losses in the looping flow are thus VHps–VLps.

Figure 3:
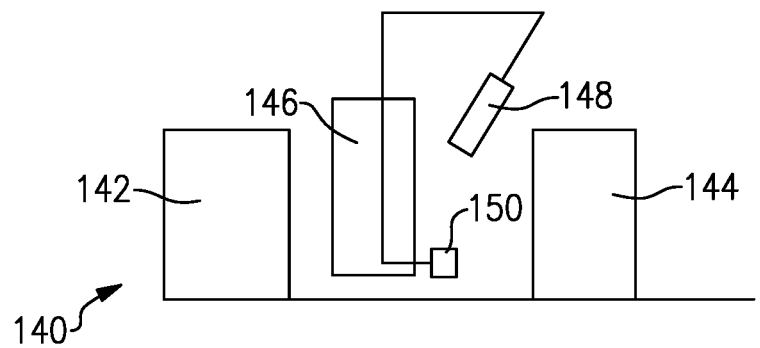
FIG. 3 shows an embodiment of a compressor cooling arrangement.

FIG. 3 shows a compressor section 140 wherein compressor rotors 142 and 144 are spaced axially, and a high swirl vane or stator 146 is positioned intermediate the two. A tap 148 is positioned downstream of vane 146. The tap 148 would communicate air over heat exchangers, and then return the air through injector 150. The view of FIG. 3 is schematic, but could function much as the FIG. 2 embodiment.

Figure 4:
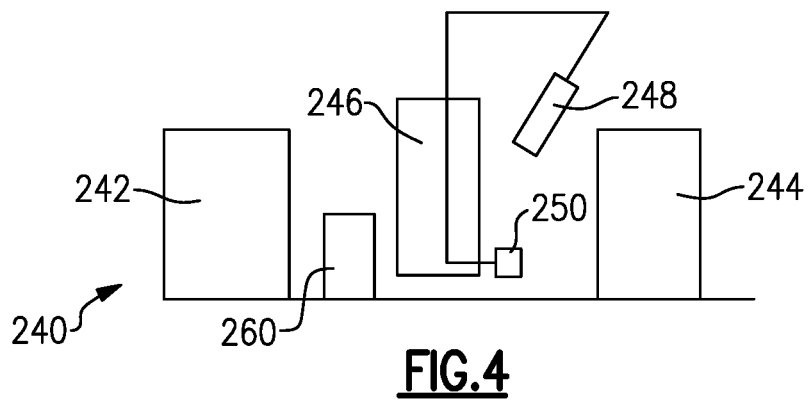
FIG. 4 shows another embodiment of a compressor cooling arrangement.

FIG. 4 shows a compressor section 240, first rotor 242 and a second rotor 244. An intermediate high swirl vane or stator 246 is positioned downstream of rotor 242. A tap 248 would communicate air over heat exchangers and then return the air through injector 250. Thus, this embodiment is similar to the FIG. 3 embodiment. However, a gear reduction 260 is placed between the rotors 242 and 244 such that the rotor 242 can rotate at slower speeds. In this embodiment, the rotor 242 may be a fan rotor while the rotor 244 is a compressor rotor.

The fan section 100 and the compressor section 140/240 have a plurality of spaced rotor stages, and static guide vanes intermediate the spaced rotor stages. The static guide vanes 112/146/246 provide swirl into air passing toward a downstream one of the spaced rotor stages. An outer housing surrounds the spaced rotor stages. A diverter 114/148/248 diverts a portion of air radially outwardly through the outer housing, and across a heat exchanger. The diverted air passes back into a duct radially inwardly through the outer housing, and is exhausted toward the downstream one of the spaced rotors.

The FIG. 2A/2B engine has the ducts 114/116/118/120 extending in a first axial direction through duct 116, then being bent through elbow 118 back into a return duct 120 before being exhausted through injector 124.

Figure 5A:
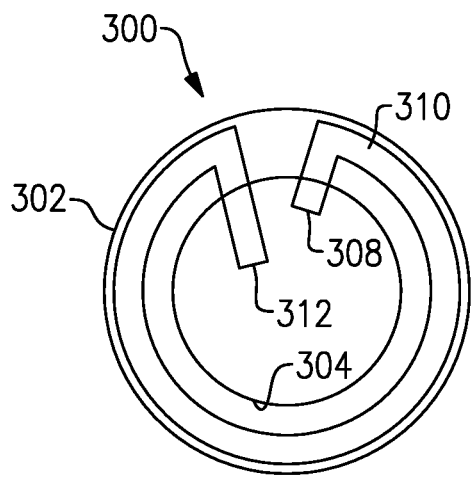
FIG. 5A shows an alternative embodiment.
Figure 5B:
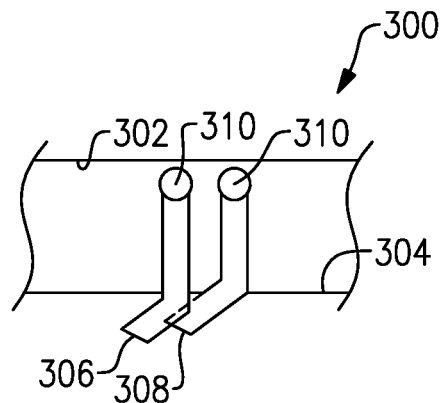
FIG. 5B is another schematic view of the FIG. 5A embodiment.

FIGS. 5A and 5B show an alternative ducting arrangement 300. Here, the bypass housing 302 and the core housing 304 are provided with a plurality of diverts 306 and 308 each communicating with ducts 310 which extend circumferentially from the diverter 308 to the injector 312 as shown in FIG. 5A. Or, a single duct extending circumferentially is also an option.

A designer would understand that by selecting from the several options, preferred flow characteristics may be achieved.

Notably, the ducts 114-116, 118, 120, 122, 310 may be utilized to provide short lengths and relatively large radius bends to minimize pressure loss across the flow path. As is clear from the drawings, each of the ducts 122, and the air communicated between tap 148 and injector 150, and between tap 248 and injector 250 extend radially inwardly through their respective static vanes 112, 146 and 246. In addition, the air leaving the injectors 124, 150 and 250 leaves the ducts downstream of their respective vanes 112, 146 and 246.

A gas turbine engine section could be said to include a plurality of spaced rotor stages. There is a swirl means intermediate the spaced rotor stages for providing swirl into air passing toward a downstream one of the spaced rotor stages. An outer housing surrounds the spaced rotor stages. Diverter means divert a portion of air radially outwardly through the outer housing, and across at least one heat exchanger. The diverter means pass the diverted air back into a duct radially inwardly through the outer housing. The diverter means exhaust the air toward the downstream one of the spaced rotor stages. The means intermediate the spaced rotor stages includes a static guide vane.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a plurality of spaced rotor stages, with a static guide vane intermediate said spaced rotor stages, said static guide vane providing swirl into air passing toward a downstream one of said spaced rotor stages, wherein a swirl angle imparted by said static guide vane is greater than 40 degrees, and an outer housing surrounding said spaced rotor stages, a diverter diverting a portion of air from a location which is upstream of said downstream one of said spaced rotor stages radially outwardly through said outer housing, and across at least one heat exchanger, with the diverted air passing back into a duct radially inwardly through said outer housing, and upstream of said downstream one of said spaced rotor stages, and being exhausted toward said downstream one of said spaced rotor stages;

wherein said spaced rotor stages are both either fan rotor stages or compressor rotor stages, and are upstream of a combustor section; and wherein only a portion of the air is diverted radially outwardly, with a main air flow continuing on to said downstream one of said spaced rotor stages without being diverted.

2. The gas turbine engine as set forth in claim 1, wherein said exhausted air passes through an injector, and said injector imparts swirl into the air exhausting toward the downstream one of the spaced rotor stages.

3. The gas turbine engine as set forth in claim 2, wherein a swirl angle imparted by said injector is greater than a swirl angle imparted by said static guide vane.

4. The gas turbine engine as set forth in claim 1, wherein said swirl angle is greater than 55 degrees.

5. The gas turbine engine as set forth in claim 1, wherein said at least one heat exchanger cools an electronic component.

6. The gas turbine engine as set forth in claim 1, wherein said at least one heat exchanger cools air from a compressor rotor.

7. The gas turbine engine as set forth in claim 1, wherein said spaced rotor stages are fan or compressor rotors, and a swirl angle imparted by said static guide vane is greater than 40 degrees.

8. The gas turbine engine as set forth in claim 1, wherein a bypass housing surrounds said outer housing and said at least one heat exchanger is positioned within a flow path in said bypass housing.

9. The gas turbine engine as set forth in claim 8, wherein air in said flow path cools said at least one heat exchanger.

10. The gas turbine engine as set forth in claim 1, wherein there are a plurality of heat exchangers.

11. The gas turbine engine as set forth in claim 1, wherein said swirl angle is greater than 55 degrees.

12. The gas turbine engine as set forth in claim 1, wherein said portion of air diverted radially outwardly passes through a duct, and said duct extends generally axially in one direction, then being turned back in an opposed direction before passing radially inwardly and is exhausted.

13. The gas turbine engine as set forth in claim 1, wherein said portion of air diverted radially outwardly passes into a duct which extends circumferentially around a center axis of said engine before being directed radially inwardly and being exhausted.

14. The gas turbine engine as set forth in claim 1, wherein air leaving said duct leaves said duct downstream of said static guide vane.

15. The gas turbine engine as set forth in claim 1, wherein said duct extends radially inwardly through said static guide vane.

16. A gas turbine engine comprising:

a plurality of spaced rotor stages, with a static guide vane intermediate said spaced rotor stages, said static guide vane providing swirl into air passing toward a downstream one of said spaced rotor stages, and an outer housing surrounding said spaced rotor stages, a diverter diverting a portion of air from a location which is upstream of said downstream one of said spaced rotor stages radially outwardly through said outer housing, and across at least one heat exchanger, with the diverted air passing back into a duct radially inwardly through said outer housing, and upstream of said downstream one of said spaced rotor stages, and being exhausted toward said downstream one of said spaced rotor stages;

wherein said spaced rotor stages are both either fan rotor stages or compressor rotor stages, and are upstream of a combustor section;

wherein only a portion of the air is diverted radially outwardly, with a main air flow continuing on to said downstream one of said spaced rotor stages without being diverted; and wherein said exhausted air leaves said duct downstream of said static guide vane.

17. The gas turbine engine as set forth in claim 16, wherein said exhausted air passes through an injector, and said injector imparts swirl into the air exhausting toward the downstream one of the spaced rotor stages.

18. A gas turbine engine comprising:

a plurality of spaced rotor stages, with a static guide vane intermediate said spaced rotor stages, said static guide vane providing swirl into air passing toward a downstream one of said spaced rotor stages, and an outer housing surrounding said spaced rotor stages, a diverter diverting a portion of air from a location which is upstream of said downstream one of said spaced rotor stages radially outwardly through said outer housing, and across at least one heat exchanger, with the diverted air passing back into a duct radially inwardly through said outer housing, and upstream of said downstream one of said spaced rotor stages, and being exhausted toward said downstream one of said spaced rotor stages;

wherein said spaced rotor stages are both either fan rotor stages or compressor rotor stages, and are upstream of a combustor section;

wherein only a portion of the air is diverted radially outwardly, with a main air flow continuing on to said downstream one of said spaced rotor stages without being diverted; and wherein said duct extends radially inwardly through said static guide vane.

19. The gas turbine engine as set forth in claim 18, wherein said exhausted air passes through an injector, and said injector imparts swirl into the air exhausting toward the downstream the plurality of spaced rotor stages.

20. The gas turbine engine as set forth in claim 18, wherein air leaving said duct leaves said duct downstream of said static guide vane.

* * * * *